United States Patent [19]

Gastinger et al.

[11] Patent Number: 5,250,581

[45] Date of Patent: Oct. 5, 1993

[54] POLYMER POLYOLS CONTAINING HALOGENATED AROMATIC MONOMERS

[75] Inventors: Robert G. Gastinger, West Chester, Pa.; John E. Hayes, Wilmington, Del.; Philippe C. Motte, Media, Pa.

[73] Assignee: Arco Chemical Technology, L.P., Wilmington, Del.

[21] Appl. No.: 588,648

[22] Filed: Sep. 26, 1990

[51] Int. Cl.$^5$ .................. C08G 18/50; C08G 18/28
[52] U.S. Cl. ..................... 521/137; 521/146; 521/170; 521/171; 525/404; 525/455
[58] Field of Search .......... 525/404, 407, 455; 521/137, 146, 170, 171

[56] References Cited

U.S. PATENT DOCUMENTS

| | | | |
|---|---|---|---|
| 3,655,553 | 4/1972 | De Wald | 252/1 |
| 3,925,506 | 12/1975 | Jin et al. | 260/836 |
| 3,953,393 | 4/1976 | Ramlow et al. | 260/31.8 R |
| 4,214,055 | 7/1980 | Seefried, Jr. et al. | 521/137 |
| 4,394,491 | 7/1983 | Hoffman | 525/404 |
| 4,629,759 | 12/1986 | Rock | 525/147 |
| 4,640,935 | 2/1987 | Fisk et al. | 521/137 |
| 4,711,941 | 12/1987 | Younes | 526/272 |
| 4,745,133 | 5/1988 | Grinbergs et al. | 521/137 |
| 5,059,641 | 10/1991 | Hayes et al. | 525/404 |

*Primary Examiner*—John Kight, III
*Assistant Examiner*—John M. Cooney, Jr.
*Attorney, Agent, or Firm*—David L. Mossman; Dennis M. Kozak

[57] ABSTRACT

Novel polymer polyols based on halogenated aromatic monomers such as tribromostyrene give polyurethane foams with improved flame retardant properties. For example, replacing conventional SAN polymer polyols with tribromostyrene (TBS)/acrylonitrile polymer polyols allows the preparation of polyurethane foams passing British Standard 5852, Part 2, Ignition Source 5 Combustion Test and having better ASTM E-906 values without the need for solid fillers such as melamine or aluminum trihydrate, although these and other flame retardant additives may be optionally employed as well. Elimination of these fillers also provides other improvements such as superior strength and better compression set properties. The TBS dispersions may also be used in conjunction with melamine to eliminate the need for liquid fire retardant additives.

61 Claims, No Drawings

5,250,581

POLYMER POLYOLS CONTAINING HALOGENATED AROMATIC MONOMERS

FIELD OF THE INVENTION

The invention relates to the polymer polyols useful in the synthesis of polyurethane compositions, and in one aspect, is more particularly related to polymer polyols having fire retardant monomers incorporated therein.

BACKGROUND OF THE INVENTION

Polyurethane foams, formed by the reaction of a polyisocyanate with a polyhydroxyl-containing compound in the presence of a suitable catalyst, are widely accepted as padding materials for cushions in furniture, automobiles and the like. Polyurethane foams are also used in sponges and for other uses that require high liquid absorption properties, such as specialty packaging and personal care and hygiene items, including highly absorbent diapers. Polyisocyanurate foams, made with a different catalyst to increase cross-linking relative to polyurethane foams, are often used as insulation in the building and construction industry.

The components used to make polyurethane foams have often been modified or added to in attempts to improve one or more properties of the resultant foam. For example, polymer polyols, made by the polymerization of monomers in the presence of a base polyol, are often used to supplement or in place of the polyhydroxyl-containing component to enhance polyurethane foam properties. Various other materials are added to the foam formulation such as antioxidants, stabilizers and flame retardants. Flame retardants inhibit the burning of a polyurethane foam should it ignite. Typical flame retardant additives include, but are not limited to, antimony trioxide, phosphate ester plasticizers and halogenated compounds.

A common problem with additives or fillers to polyurethane foam formulations is that the distribution of the additive throughout the formulation may not be uniform which results in isolated areas of the foam that are defective or that at least do not posses the benefits desired throughout the foam. Another typical disadvantage is that other foam properties, such as load bearings properties, tear and tensile strengths, etc., may be degraded simply by the physical presence of some additives. It would be advantageous if fire retardant polyurethane foams could be produced without the extra addition of a separate material and/or the degradation of final foam properties.

Interest in polyurethane foams with enhanced ignition resistance has dramatically increased throughout the world since the introduction of new flammability standards for foams in Great Britain. However, it is also generally accepted that foams having flame retardants which contain phosphorus and halogens, as noted above, have limitations in meeting current fire retardancy requirements, and more particularly, the recent British Standard 5852, Part 2, Ignition Source 5 specifications. The technologies now used to produce foams meeting these new combustion requirements involve the addition of substantial amounts of solid flame retardant, predominantly melamine, but also aluminum hydrate or exfoliated graphite with increased level of standard liquid flame retardant to foam formulation.

As noted, the addition of solid flame retardants, such as melamine, to provide adequate combustion modification negatively influences some of the major foam processing parameters. For example, the viscosity of the polyol-filter dispersion is high; the cell opening is non-uniform, resulting in a significant top-to-bottom density gradient, and large amounts of undesirable chlorofluorocarbon blowing agents are required to lower the density.

U.S. Pat. Nos. 3,655,553; 3,953,393; and 4,214,055 describe polymer polyols made by homo- or copolymerizing vinyl chloride or vinylidene chloride in a polyol. These materials are claimed to produce polyurethane foams with improved fire retardant properties. However, there are problems with these materials. Polymers of vinyl and vinylidene chloride are thermally unstable. Thermal decomposition proceeds with the evolution of hydrogen chloride. This results in products which are discolored and have high acid numbers. The high acidity causes urethane catalysis problems.

The preparation of urethane foams having reduced flammability from polymer polyols made by copolymerizing bis($\beta$-chloroethyl)vinyl phosphonate in a polyol is described in U.S. Pat. No. 3,925,506. Vinylphosphonates are very unreactive monomers and do not incorporate into the polyol in high conversion. None of these patents address the difficulty of meeting the increased fire retardancy standards, discussed above.

SUMMARY OF THE INVENTION

Accordingly, it is an object of the present invention to provide a polyurethane foam that has improved fire retardancy but which requires no addition of a separate solid additive to the formulation to achieve the increased fire retardancy.

It is another object of the present invention to provide a novel halogen-containing polymer polyol which is stable, and which may be reacted with a polyisocyanate to produce a flame retardant polyurethane foam.

It is yet another object of the invention to provide a polymer polyol incorporating in addition polymerizable aromatic monomer having ethylenic unsaturation and at least one halogen in its structure, and which may be prepared in good conversion.

In carrying out these and other objects of the invention, there is provided, in one form, a polymer polyol produced by polymerizing, via a free-radical reaction, an addition polymerizable aromatic monomer component with ethylenic unsaturation having at least one halogen in its structure, in the presence of a polyol.

DETAILED DESCRIPTION OF THE INVENTION

It has been discovered that addition polymerizable monomers with ethylenic unsaturation and having at least one aromatic halogen in their structures may be polymerized in the presence of a base polyol to give a polymer polyol that may be reacted with a polyisocyanate in the presence of a polyurethane catalyst to give polyurethane foams with improved flame retardancy properties. By incorporating the halogen in this fashion, it is more evenly distributed over the entire foam. These monomers have a halogen atom substituted on an aromatic ring. These types of halogen flame retarding agents also work well in melamine-containing foams.

More specifically, the addition polymerizable monomer has ethylenic unsaturation and at least one halogen atom. The halogen atom may be chlorine, bromine, iodine and mixtures thereof. In a particular aspect of the invention, the monomer may have a structure such as:

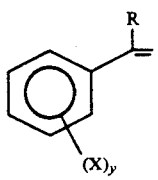

where R is an alkyl, aryl, alkylaryl group or hydrogen; X is a halogen atom selected from the group consisting of Cl, Br and I, and y ranges from 1 to 5.

A particularly preferred halogenated monomer is 2,4,5-tribromostyrene (TBS); represented by the formula above where X is bromine and y is 3. This monomer has 70 wt % bromine and polymerizes well with styrene and acrylonitrile. In fact, it has been surprisingly discovered that in some cases when TBS is copolymerized with acrylonitrile alone that no dispersant is required to maintain the polymer polyol as homogeneous.

The halogen-containing monomer may be homopolymerized or copolymerized with an additional monomer. Two comonomers that may be employed in the method and polymer polyols of the present invention are both styrene and acrylonitrile to make a terpolymer together with the halogen-containing monomer. However, as noted, one preferred form of the invention simply uses the halogen-containing monomer and another comonomer, without styrene. Other suitable monomers include, but are not limited to, butadiene, isoprene, 1,4-pentadiene, 1,6-hexadiene, 1,7-octadiene, styrene, acrylonitrile, methacrylonitrile, α-methylstyrene, methylstyrene, 2,4-dimethylstyrene, ethyl styrene, isopropylstyrene, butylstyrene, substituted styrenes, such as cyanostyrene, phenylstyrene, cyclohexylstyrene, benzylstyrene, substituted styrenes such as cyanostyrene, nitrostryrene, N,N-dimethylamino-styrene, acetoxystyrene, methyl 4-vinylbenzoate, phenoxystyrene, p-vinyl diphenyl sulfide, p-vinylphenyl phenyl oxide, acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, ethyl α-ethoxyacrylate, methyl α-acetoaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, vinyl esters, vinyl ethers, vinyl ketones, vinyl acetate, vinyl alcohol, vinyl butyrate, isopropenylacetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, dimethyl fumarate, dimethyl maleate, maleic acid, crotonic acid, fumaric acid, itaconic acid, monomethyl itaconate, t-butyl-aminoethyl methacrylate, dimethylaminoethyl methacrylate, glycidyl acrylate, allyl alcohol, glycol monoesters of itaconic acid, vinyl pyridine, maleic anhydride, maleimide, N-substituted maleimides, such as N-phenylmaleimide and the like.

The polymerization initiator catalyst may be any suitable initiator for the particular monomers employed. Suitable catalytic initiators useful in producing the polymer polyol compositions of this invention are the free radical type of vinyl polymerization catalysts, such as the peroxides, persulfates, perborates, percarebonates, azo compounds, and the like. Specific examples include, but are not limited to, 2,2'-azo-bis-isobutyronitrile (AIBN), dibenzoyl peroxide, lauroyl peroxide, di-t-butyl peroxide, diisopropyl peroxide carbonate, t-butyl peroxy-2-ethylhexanoate, t-butylperpivalate, 2,5-dimethyl-hexane-2,5-di-per-2-ethyl hexoate, t-butylperneodecanoate, t-butylperbenzoate, t-butyl percrotonate, t-butyl perisobutyrate, di-t-butyl perphthalate, 2,2'-azo-bis(2-methylbutanenitrile) for example. Other suitable catalysts may be employed, of course.

The total halogen content of the polymer polyol will vary across a wide range depending on the monomer used, monomer proportions, preparation conditions and other factors.

The aromatic halogen containing monomer may be employed in an amount of from about 1 wt. % to about 100 wt. % based on the total monomers, preferably in an amount of from about 50 wt. % to about 100 wt. %. The monomer mixture is employed in an amount within the range of from about 5 to 60 wt. %, based on the total weight of monomers and polyol, preferably from about 15 to 40 wt. %.

The polymer polyols of the present invention can be produced by polymerizing the monomer mixture in the selected polyol at a temperature of from about 60° C. to about 150° C., preferably from about 100° C. to about 130° C., in the presence of a free radical initiator. Any conventional process for preparing polymer polyols can be employed to prepare the polymer polyols of this invention. Both semi-batch and continuous processes are suitable. For the semi-batch process, any suitable addition time of the monomer feed may be employed, for example, the addition time may range from about 0.5 to about 5.0 hours, preferably from about 1 to about 2.5 hours. The reaction may also be carried out in the presence of an organic solvent. Aromatic solvents such as toluene and xylenes are preferred. A dispersant may also be employed. Suitable dispersants are any which are known for conventional SAN polymer polyols. The reaction may also be conducted in the presence of chain transfer agents.

In accordance with this invention, the remaining polyurethane foam components are expected to be conventional, indicating that the invention is compatible with standard formulations. For example, a variety of relatively high molecular weight polyether and/or polyester polyols are expected to be useful together with the polymer polyols for the polyurethane compositions of this invention. These polyols may also be suitable as the polyol in making the polymer polyols of the present invention. These polyols include, but are not necessarily limited to, ethylene oxide (EO) capped polyols and polyols not capped with EO, as well as propylene oxide (PO) and/or butylene oxide containing polyols. The polyols may contain blocks or random distributions of these various alkylene oxides added to suitable initiators. In one aspect, the polyol preferably has a molecular weight of from about 2000 to 10,000, and more preferably from about 3000 to 8000, and is typically made by the reaction of an initiator having a plurality of reactive hydrogens thereon with one or more alkylene oxides. Suitable initiators include, but are not limited to, glycerin, alkanolamines, alkylamines, aryl or aromatic amines, sucrose, sorbitol, trimethylol propane (TMP), α-methylglucoside, β-methylglucoside, or other methylglucoside, resins of phenol, aniline and mixed phenol aniline, such as methylenedianiline or bisphenol A, Mannich condensates and mixtures thereof, for example. The polyol may be made by alkoxylating the initiator with a desired number of moles of an alkylene oxide. Preferably, the alkylene oxide has two to four carbon atoms, and is thus, EO, PO, butylene oxide or mixtures thereof, as noted. The alkylene oxides may be mixed upon addition, or may be added to the polyol initiator chain separately to form blocks or caps. In one aspect, a mixture of ethylene oxide and propylene oxide are added to the initiator. The alkoxylation may or may not be catalyzed; KOH is a commonly used catalyst, although others may be employed. For example, double metal cyanide catalysts may be employed, in particular zinc hexacyanocobaltate, and the polyols may be prepared in accordance with the methods described in U.S. Pat. Nos. 3,029,505; 3,900,518; 3,941,049 and 4,355,100, incorporated by reference herein.

Although a dispersant may not be necessary to keep the polymerized material uniformly dispersed in the base polyol, a wide variety of dispersants may be used in conjunction with the polymer polyols of the present invention. For example, suitable dispersants may include, but are not limited to, glycerin initiated polyethers of alkylene oxides, specifically propylene oxide and ethylene oxide; polyacrylate graft-polyols made by polymerizing at least one acrylate monomer or polymer in a polyol where the resultant polyacrylate is soluble in the polyol employed; high molecular weight polyol dispersants made by adding an alkylene oxide component to a polyfunctional initiator in the presence of a zinc hexacyanocobaltate catalyst; epoxy resin-modified polyols, and the like.

A catalyst is typically employed in preparing the polyurethane foams in the conventional manner. Such catalysts may include one or more of the following:

(a) Tertiary amines such as trimethylamine; triethylamine; N-methylmorpholine; N-ethylmorpholine; N,N-dimethylbenzylamine; N,N-dimethylethanolamine; N,N,N',N'-tetramethyl-1,4-butanediamine; N,N-dimethylpiperazine; 1,4-diazobicyclo[2.2.2]octane; triethylenediamine and the like;

(b) Tertiary phosphines such as trialkylphosphines; dialkylbenzylphosphines, and the like;

(c) Strong bases, such as alkali and alkaline earth metal hydroxides; alkoxides; and phenoxides;

(d) Acidic metal salts of strong acids, such as ferric chloride; stannic chloride, stannous chloride; antimony trichloride; bismuth nitrate and chloride; and the like;

(e) Chelates of various metals such as those which can be obtained from acetylacetone; benzoylacetone; trifluoroacetyl acetone; ethyl acetoacetate; salicyclaldehyde; cyclopentanone-1-carboxylate; acetylacetoimine; bis-acetylacetonealkylenediamine; salicyclaldehydeimine; and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals, such as $Ti(OR)_4$; $Sn(OR)_4$; $Al(OR)_3$; and the like, wherein R is alkyl or aryl, and the reaction products of alcoholates with carboxylic acids, β-diketones, and 2-(N,N-dialkylamino)alcohols;

(g) Salts of organic acids with a variety of metals, such as alkali metals, alkaline earth metals, Al, Sn, Pb, Mn, Co, Ni and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi and metal carbonyls of iron and cobalt.

Of course, combinations of any of the above polyurethane catalysts may be employed. Usually, the amount of catalyst employed ranges from about 0.01 to about 5.0 pbw percent, based on 100 pbw of the polyol. More often, the amount of the catalyst used is about 0.2 to about 2.0 pbw.

The polyol blend for the polyurethane composition is reacted in the presence of one or more of the above catalysts with a polyisocyanate according to conventional procedures. The polyisocyanate used may be any aromatic or aliphatic polyisocyanate, such as toluene diisocyanates (TDIs); polymeric isocyanates and aliphatic diisocyanates. Typical aromatic polyisocyanates include, but are not limited to, m-phenylene diisocyanate; p-phenylene diisocyanate; polymethylene polyphenylisocyanate; 2,4-toluene diisocyanate; 2,6-toluene diisocyanate; dianisidine diisocyanate; bitolylene diisocyanate; naphthalene-1,4-diisocyanate; diphenylene-4,4'-diisocyanate; aliphatic-aromatic diisocyanates, such as xylylene-1,4-diisocyanate; xylylene-1,2-diisocyanate; xylylene-1,3-diisocyanate; bis(4-isocyanatophenyl)methane; bis(3-methyl-4-isocyanatophenyl)methane; and 4,4'-diphenylpropane diisocyanate. Suitable aliphatic diisocyanates would include isophorone diisocyanate; hexamethylene diisocyanate; and methylene-bis-cyclohexylisocyanate. Toluene diisocyanates are preferred, in one aspect of the invention.

Aromatic polyisocyanates suitable for use include methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts.

Foaming is carried out in the presence of water and, optionally, additional organic blowing agents. The water is normally used in amounts of 0.5 to 15 parts by weight, preferably, 1.0 to 10 parts by weight (pbw) based on 100 parts by weight of the polymer polyol and any additional polyol present. The organic blowing agents optionally used along with the water are known in the art and are, for example, monofluorotrichloromethane, difluorodichloromethane, methylene dichloride and others generally known in the art. Additives to regulate the cell size and the cell structure, for example, silicone surfactant such as dimethylpolysiloxanes, may also be added to the foaming mixture. Fillers, dyes or plasticizers of known types may also be used. These and other additives are well known to those skilled in the art.

The method and polymer polyols of the invention will be further described with respect to the following illustrative examples. The formulations of the polymer polyols using various amounts of styrene, acrylonitrile and TBS monomers are presented along with the various properties of the polymer polyols. The S/AN/TBS ratio refers to the wt. proportions of styrene, acrylonitrile and tribromostyrene, respectively. Note that in Examples 1-3 and 5 using no styrene that no dispersant is used. Then, polyurethane foam formulations and their properties are given indicating that indeed the polyurethane foams made using the polymer polyols of this invention have improved flame retardancy.

PROCEDURES FOR MEASUREMENTS OF PHYSICAL PROPERTIES OF POLYMER POLYOLS

Viscosity was measured using a Brookfield cone and plate viscometer, Spindle #CP-52, operated at 20 secs$^{-1}$ at 25° C.

Particle sizes were measured using a Coulter N4 Particle Size Analyzer with o-xylene or isopropyl alcohol as the dispersing media.

Centrifugable solids were determined by centrifuging a sample of the polymer polyol for about 24 hours at about 3300 rpm and 1470 radial centrifugal "g" forces. The centrifuge tube was then inverted and allowed to drain for 4 hours. The non-flowing cake at the bottom of the tube is reported as weight percent of the initial weight of the sample tested.

PREPARATION OF POLYMER POLYOLS

Into a reactor fitted with a stirrer, condenser, thermometer and addition tube and under a blanket of nitrogen were charged the amounts of reactants indicated in Tables I and II. After heating the reactor charge to the reaction temperature, the feed charge was added over the indicated time period. Upon completion of the addition, the reaction product was held at the reaction temperature for 0.5 to 1.0 hours, then stripped of residual monomers for 1.0 hour at 115°-125° C. and <5 mm Hg.

TABLE I

| Example # | Tribromostyrene-Containing Polymer Polyols | | | | | | |
|---|---|---|---|---|---|---|---|
| | 1 | 2 | 3 | 4 | 5 | 6 | 7 |
| Monomer Charge, Wt. % | 20 | 20 | 20 | 20 | 30 | 30 | 30 |
| S/AN/TBS | 0/75/25 | 0/50/50 | 0/50/50 | 0/25/75 | 0/50/50 | 65/10/25 | 40/10/50 |
| Base Polyol | A | A | A | A | A | A | A |
| Dispersnt | none | none | none | 1 | none | 2 | 2 |
| Reaction Temp., °C. | 120 | 120 | 120 | 120 | 120 | 120 | 120 |
| Initiator Conc., Wt. % | 0.5 | 0.5 | 0.25 | 0.5 | 0.5 | 0.5 | 0.5 |
| Feed, Addition Time, hours | 1.5 | 1.5 | 1.5 | 2.0 | 2.0 | 2.0 | 2.0 |
| Feed, g. | | | | | | | |
| Tribromostyrene | 50 | 40 | 220 | 300 | 300 | 150 | 300 |
| Acrylonitrile | 150 | 40 | 220 | 100 | 300 | 60 | 60 |
| Styrene | — | — | — | — | — | 390 | 240 |
| VAZO 67 | 5.0 | 2.0 | 5.5 | 10 | 10 | 10 | 10 |
| Base Polyol | 720 | 256 | 1408 | 1440 | 700 | 1120 | 1120 |
| Dodecylmercaptan | — | — | — | — | — | 2.0 | 2.0 |
| Xylene | — | — | — | 200 | 200 | — | — |
| Reactor Charge, g. | | | | | | | |
| Base Polyol | 80 | 64 | 352 | 80 | 700 | 210 | 210 |
| Dispersant | — | — | — | 80 | — | 70 | 70 |
| Polymer Polyol Properties | | | | | | | |
| Viscosity, cps. 20/sec. | 3420 | 2920 | 1620 | 3540 | 3780 | 2560 | 2560 |
| Particle size, μ | 0.33 | 0.27 | 0.27 | 0.29 | 0.27 | 0.97 | 0.34 |
| Centrifugable Solids, Wt. % | — | — | 2.6 | 3.0 | 3.5 | 14 | 4.4 |

TABLE II

| Example # | Tribromostyrene-Containing Polymer Polyols | | | | | | |
|---|---|---|---|---|---|---|---|
| | 8 | 9 | 10 | 11 | 12 | 13 | 14 |
| Monomer Charge, Wt. % | 20 | 20 | 20 | 20 | 20 | 30 | 35 |
| S/AN/TBS | 50/40/10 | 50/30/20 | 50/40/10 | 50/30/20 | 0/13/87 | 0/25/75 | 0/25/75 |
| Base Polyol | B | B | A | A | A | A | A |
| Dispersant | 2 | 2 | 2 | 2 | 2 | 1 | 1 |
| Reaction Temp., °C. | 120 | 120 | 120 | 120 | 120 | 120 | 120 |
| Initiator Conc., Wt. % | 0.5 | 0.5 | 0.5 | 0.5 | 0.5 | 0.5 | 0.5 |
| Feed, Addition Time, hours | 1.5 | 1.5 | 1.5 | 1.5 | 1.5 | 2.0 | 2.0 |
| Feed, g. | | | | | | | |
| Tribromostyrene | 20 | 40 | 20 | 40 | 86.5 | 540 | 525 |
| Acrylonitrile | 80 | 60 | 80 | 60 | 13.5 | 150 | 175 |
| Styrene | 100 | 100 | 100 | 100 | — | — | — |
| VAZO 67 | 5.0 | 5.0 | 5.0 | 5.0 | 2.5 | 10 | 10 |
| Base Polyol | 720 | 720 | 720 | 720 | 338.6 | 1240 | 1140 |
| Xylene | — | — | — | — | — | 200 | 300 |
| Reactor Charge, g. | | | | | | | |
| Base Polyol | 48 | 48 | 48 | 48 | 45.4 | 80 | 80 |
| Dispersant | 32 | 32 | 32 | 32 | 16 | 80 | 80 |
| Polymer Polyol Properties | | | | | | | |
| Viscosity, cps. 20/sec. | 1340 | 1230 | 2270 | 2120 | 2520 | 7230 | 8450 |
| Particle size, μ | 0.44 | 0.44 | 0.39 | 0.39 | 0.34 | 0.34 | 0.35 |
| Centrifugable Solids, Wt. % | 0.99 | 2.2 | 2.1 | 2.0 | 3.3 | 5.0 | 5.8 |

In the following Examples, the novel polymer polyols based on tribromostyrene/acrylonitrile (TBS/AN) dispersions were used in slabstock formulations without addition of solid flame retardants, to produce foams meeting BS 5852, Part 2, Ignition Source 5 Test requirements (mentioned previously) for densities varying from 1.6 pcf to 2.5 pcf. These foams exhibit superior strength and compression set properties, under both dry and humid conditions, as compared with those produced using conventional technologies with solid flame retardant additives.

The following Examples 15 through 40 illustrate the practice of using the novel polymer polyols of the invention in slabstock foam formulations.

All results were generated from polyurethane resin foams produced both on a Maxfoam laboratory scale machine and by hand-mix pours into 50 liter carton boxes. The polyisocyanate used was TDI T-80, a commercial 80/20 blend of 2–4 and 2–6 toluene diisocyanate.

The physical properties were measured according to ASTM D3574 and RENAULT NFT 56112 (humid compression set). The ignition resistance properties were measured according to ASTM E-906 or Ohio State University (OSU) Heat of Release Test. This test has been selected as the evaluation instrument for an SPI Industry Research Project to develop a system for grading flexible polyurethane foam according to ignition resistance. For further information, see J. F. Szabot, et al., *Proceedings of the SPI 31st Annual Technical/Marketing Conference*, p. 190, 1988; and A. K. Schrock, et al., *Proceedings of the SPI 32nd Annual Technical/Marketing Conference*, p. 451, 1989.

The combustion resistance properties were measured according to the BS 5852, Part 2, Ignition Source 5 Test, currently used for foams to meet the requirements of British Furniture and Furnishings Fire Safety Regulations of 1988. The slope E values (time to the maximum rate of heat release [MRHR] divided into MRHR) were found to be particularly important when correlations were made with the BS 5852 weight losses. In most cases, a slope E greater than about 800 BTU/ft$^2$-min$^2$ was found to result in failure of the BS 5852 test.

As shown in Table III, for densities varying from 1.6 pcf to 2.6 pcf, the foams prepared from TBS/AN dispersion polyols exhibit better ASTM E-906 values than those based on styrene/acrylonitrile (S/AN) when using the same amounts of solid and liquid fire retardant additives; compare Examples 15 and 16; 21 and 22. For all examples in Tables III and IV, the ratio of monomers in both the S/AN and TBS/AN polymer polyols was 75/25.

The slope E values which correlate the best with BS 5852 combustion measurements, are below about 800 Btu/ft$^2$-min$^2$ for all examples and surprisingly also for TBS/AN based foams produced without any solid fire retardant additives (melamine). See Examples 18, 20 and 24.

Table IV compares the physical properties of non-melamine filled foams prepared from TBS/AN dispersion polyols to melamine filled foams produced with conventional S/AN dispersion polyols. When 50 parts per hundred (pph) of the dispersion polyol was used with 50 parts of THANOL F5505 polyol, the total solids content over all polyol component was 10%. When 30 pph of the dispersion polyol was used, the total solids content was 6%.

All examples relate to foams which pass the BS 5852, Part 2, Ignition Source 5 Combustion Test, with a weight loss $\leq 60$ g.

Non-melamine filled foams based on TBS/AN dispersion polyols exhibit superior strength properties (tensile-elongation), as well as better compression set properties (70% dry and wet compression set); see particularly Examples 28, 29, 37 and 40 as compared with the S/AN-polyol-based foams. The general improvement of the above-mentioned physical properties is also confirmed for formulations based on TBS/AN and S/AN materials containing the same amount of polymer (10%); compare Examples 25 with 28 and 29; 38 with 40. However, though it is generally accepted that liquid fire retardant additives are also required in addition to the solid fire retardant to pass BS 5852, Ignition Source 5 Combustion Test, we have surprisingly noticed that TBS/AN foams filled with melamine and no liquid fire retardant additive also pass the British Standard Combustion Test; see Example 33.

The polymer polyols of the present invention may be incorporated into polyurethane foams in many different ways. For example, the use of the polymer polyols of the invention may be used with only one of the following additional additives, or even more than one of the following additives: including, but not limited to, phosphorous compounds, halogenated compounds (present as additives, not reacted to make the polymer polyols), aluminum trihydrate, exfoliated graphite, urea, melamine and melamine derivatives. In some formulations, the polymer polyols of this invention can be used to reduce the proportion of these common additives, even though one or more may be present, at least below the proportion required to pass the British Standard 5852, Part 2, Ignition Source 5 Combustion Test in the absence of the aromatic halogenated monomers of the present inventive polymer polyols.

TABLE III

ASTM E-906 Measurements at 1.75 Watts/cm$^2$
Styrene/Acrylonitrile (S/AN) vs. Tribromostyrene/Acrylonitrile (TBS/AN) Dispersion Polyols

| Example No. | 15 S/AN | 16 TBS/AN | 17 S/AN | 18 TBS/AN | 19 S/AN | 20 TBS/AN | 21 S/AN | 22 TBS/AN | 23 S/AN | 24 TBS/AN |
|---|---|---|---|---|---|---|---|---|---|---|
| Solids, % | 10 | 10 | 10 | 10 | 6 | 6 | 10 | 10 | 10 | 10 |
| Solid Fire Retardant, Melamine, pph | 25 | 25 | 25 | 0 | 25 | 0 | 25 | 25 | 25 | 0 |
| Liquid Fire Retardant, Thermolin 101, pph | 4 | 4 | 4 | 4 | 4 | 4 | 4 | 4 | 4 | 4 |
| DE 60° F., pph[1] | — | — | 4 | 4 | 4 | 4 | — | — | 4 | 4 |
| Isocyanate Index | 114 | 114 | 114 | 114 | 114 | 114 | 114 | 114 | 110 | 110 |
| Density, pcf | 1.68 | 1.62 | 1.54 | 1.53 | 1.86 | 1.90 | 2.27 | 2.31 | 2.59 | 2.61 |
| Max RHR, BTU/Ft$^2$-Min | 1212 | 885 | 1049 | 857 | 1502 | 943 | 1690 | 275 | 1757 | 1250 |
| Time, sec. | 105 | 91 | 106 | 70 | 103 | 80 | 131 | 31 | 136 | 135 |
| Slope, E, BTU/Ft$^2$-Min$^2$ | 692 | 583 | 593 | 735 | 851 | 707 | 774 | 532 | 775 | 556 |
| HRA3[2], BTU/FT$^2$ | 1902 | 1387 | 1545 | 1148 | 2007 | 1440 | 2431 | 1530 | 2709 | 1681 |

TABLE III-continued

| | ASTM E-906 Measurements at 1.75 Watts/cm² | | | | | | | | | |
|---|---|---|---|---|---|---|---|---|---|---|
| | Styrene/Acrylonitrile (S/AN) vs. Tribromostyrene/Acrylonitrile (TBS/AN) Dispersion Polyols | | | | | | | | | |
| Example No. | 15 S/AN | 16 TBS/AN | 17 S/AN | 18 TBS/AN | 19 S/AN | 20 TBS/AN | 21 S/AN | 22 TBS/AN | 23 S/AN | 24 TBS/AN |
| Weight Loss, % | 90.1 | 85.6 | 89.9 | 91.3 | 92.2 | 91.4 | 91.4 | 88.4 | 92.5 | 92.6 |

[1]Pentabromodiphenylether/aromatic phosphate blend, from Great Lakes.
[2]Heat release after 3 minutes.

TABLE IVa

BS5852, Part 2, Ignition Source 5 - Foam Physical Properties
Non-Melamine Filled TBS/AN Foams vs. Melamine Filled S/AN Foams

| Example No. | 25 | 26 | 27 | 28 | 29 | 30 | 31 | 32 | 33 | 34 |
|---|---|---|---|---|---|---|---|---|---|---|
| THANOL F5505, pph | 50 | 70 | 70 | 50 | 50 | 50 | 70 | 70 | 50 | 70 |
| S/AN dispersion polyol, pph (20% solids) | 50 | 30 | 30 | 0 | 0 | 50 | 30 | 30 | 0 | 0 |
| TBS/AN dispersion polyol, pph (20% solids) | 0 | 0 | 0 | 50 | 50 | 0 | 0 | 0 | 50 | 30 |
| Water, pph | 3.9 | 3.4 | 3.9 | 4.2 | 4.2 | 3.5 | 2.8 | 3.4 | 3.2 | 3.2 |
| Blowing agent, CFC-11, pph | 7 | 12 | 2 | 0 | 0 | 0 | 5 | 0 | 0 | 0 |
| Melamine, pph | 30 | 30 | 25 | 0 | 0 | 20 | 15 | 20 | 10 | 0 |
| Thermolin 101, pph | 5 | 4 | 4 | 8 | 4 | 4 | 4 | 4 | 0 | 4 |
| DMMP, pph | 0 | 0 | 0 | 0 | 4 | 0 | 0 | 0 | 0 | 4 |
| Isocyanate Index | 105 | 105 | 114 | 100 | 114 | 114 | 106 | 114 | 107 | 114 |
| Density, pcf | 1.42 | 1.42 | 1.60 | 1.41 | 1.42 | 2.0 | 1.9 | 1.96 | 2.07 | 1.90 |
| BS 5852, gr. ≦ 60 gr. | 48 | 42 | 40 | 36 | 31 | 39 | 43 | 40 | 30 | 43 |
| IFD 25%, lbs | 13.2 | 10.2 | 18 | 12.4 | 16.3 | 22.9 | 12.0 | 21.3 | 10.2 | — |
| 40%, lbs | 17.4 | 14.2 | 24.6 | 16.0 | 24.8 | 30.8 | 15.7 | 29.2 | 28.7 | — |
| Tensile, psi | 8.4 | 8.1 | 11.9 | 13.4 | 17.0 | 14.5 | 11.6 | 12.4 | 13.6 | — |
| Elongation, % | 105 | 110 | 114 | 161 | 146 | 109 | 112 | 109 | 128 | — |
| 50% Comp. set, % | — | — | — | 3.3 | 8.1 | — | — | 9.4 | 10 | — |
| 70% Comp. set, % | 14.9 | 18 | 12 | 12.1 | 10.2 | 10 | 11.0 | 14.0 | — | — |
| 70% Wet Comp. set, % | 83 | 88 | 78 | 72 | 70 | 70 | 65 | 57 | 30 | — |

TABLE IVb

BS5852, Part 2, Ignition Source 5 - Foam Physical Properties
Non-Melamine Filled TBS/AN Foams vs. Melamine Filled S/AN Foams

| Example No. | 35 | 36 | 37 | 38 | 39 | 40 |
|---|---|---|---|---|---|---|
| THANOL F5505, pph | 70 | 70 | 50 | 50 | 70 | 50 |
| S/AN dispersion polyol, pph (20% solids) | 30 | 30 | 0 | 50 | 30 | 0 |
| TBS/AN dispersion polyol, pph (20% solids) | 0 | 0 | 50 | 0 | 0 | 50 |
| Water, pph | 2.9 | 3.1 | 2.8 | 2.4 | 2.6 | 2.2 |
| Blowing agent, CFC-11, pph | 0 | 0 | 0 | 0 | 0 | 0 |
| Melamine, pph | 20 | 25 | 0 | 15 | 20 | 0 |
| Thermolin 101, pph | 4 | 4 | 6 | 4 | 4 | 6 |
| DMMP, pph | 0 | 0 | 0 | 0 | 0 | 4 |
| Isocyanate Index | 102 | 114 | 100 | 114 | 114 | 110 |
| Density, pcf | 2.23 | 2.27 | 2.16 | 2.62 | 2.47 | 2.61 |
| BS 5852, gr. ≦ 60 gr. | 38 | 50 | 34 | 30 | 45 | 50 |
| IFD 25%, lbs | 17.1 | 24.3 | 17.2 | 28.8 | 26.2 | 25.1 |
| 40%, lbs | 23.5 | 33.6 | 21.9 | 37.4 | 35.9 | 34.3 |
| Tensile, psi | 6.1 | 13.1 | 14.8 | 14.5 | 13.0 | 14.2 |
| Elongation, % | 120 | 149 | 182 | 128 | 132 | 186 |
| 50% Comp. set, % | 11.1 | 8.0 | 6.7 | — | — | 5.8 |
| 70% Comp. set, % | 12.4 | — | — | 9 | 8 | — |
| 70% Wet Comp. set, % | 38 | 21 | 10.4 | 20 | 17.5 | 10 |

Many modifications may be made in the polymer polyols of this invention and their method of production without departing from the spirit and scope of the invention, which is defined only in the appended claims. For example, one skilled in the art could adjust the temperature, pressure, reactants, proportions and modes of additions within the parameters set forth to provide polymer polyols with particularly advantageous properties. Alternatively, it may be discovered that a certain halogenated monomer or combination of monomers may give optimal results.

| GLOSSARY | |
|---|---|
| CFC-11 | Trichlorofluoromethane. |
| DE 60° F. | Pentabromodiphenyl ether/aromatic phosphate blend, from Great Lakes Chemical Co. |
| Dispersant 1 | A glycerin started polyether of propylene oxide and ethylene oxide, containing 15.8 wt. % ethylene oxide, modified with 1.8% EPON ® 828, and having a hydroxyl number of 21.5. The OH/epoxy ratio is 2.9. |
| Dispersant 2 | A glycerin started polyether of propylene oxide, |

GLOSSARY

|  |  |
|---|---|
|  | modified with 3.0% EPON ® 828, and having a hydroxyl number of 33. The OH/epoxy ratio is 2.3. |
| DMMP | Dimethyl methyl phosphonate liquid fire retardant from Stauffer Chemical Co. |
| Melamine | Standard grade, d50 = 90/u, d99 = 230/u from Dutch State Coal Mine (DSM). |
| Polyol A | ARCOL ® 1342 Polyol. A glycerin started polyether of propylene oxide and ethylene oxide with a hydroxyl number of 34 and a primary hydroxyl group content of 80% of the total hydroxyl content of the polyether, made by ARCO Chemical Company. |
| Polyol B | ARCOL ® 1130 Polyol. A glycerin started polyether of propylene oxide and ethylene oxide having a hydroxyl number of 48 and containing essentially secondary hydroxyl groups, made by ARCO Chemical Company. |
| S/AN dispersion polyol | A polymer modified polyol of styrene/acrylonitrile (S/AN in a ratio of 75/25) content of about 20 wt. %. Hydroxyl number is 28. |
| TBS/AN dispersion polyol | A polymer modified polyol of tribomostyrene/ acrylonitrile (TBS/AN in a ratio of 75/25) content of about 20 wt. %. Hydroxyl number is 28. |
| THANOL ® F5505 | A glycerin started polyether of propylene oxide and ethylene oxide with a hydroxyl number of 34 and a primary hydroxyl group content of 80% of the total hydroxyl content of the polyether made by ARCO Chemical Company |
| Thermolin ® 101 | Tetrakis(2 chlorethyl)-ethylene diphosphate made by Olin Chemicals. |
| VAZO ® 67 | 2,2'-Azo-bis(2-methylbutanenitrile) polymerization catalyst made by E. I. Du Pond de Nemours and Co. |

We claim:

1. A polymer polyol produced by a process comprising polymerizing, via a free-radical reaction, an addition polymerizable aromatic monomer component with ethylenic unsaturation having more than one aromatic halogen, in the presence of a base polyol.

2. The polymer polyol of claim 1 where the halogen is selected from the group consisting of chlorine, bromine, iodine and mixtures thereof.

3. The polymer polyol of claim 1 where the aromatic monomer component is selected from the group of aromatic monomers consisting of:

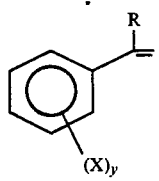

wherein R is an alkyl, aryl, alkylaryl group or hydrogen; X is a halogen atom selected from the group consisting of Cl, Br and I, and y averages from greater than 1 to 5.

4. The polymer polyol of claim 1 where the aromatic monomer component is tribromostyrene.

5. A polymer polyol produced by a process comprising polymerizing, via a free-radical reaction, a first addition polymerizable monomer component with ethylenic unsaturation, with a second addition polymerizable aromatic monomer component with ethylenic unsaturation which contains more than one aromatic halogen, in the presence of a polyol.

6. The polymer polyol of claim 5 where the halogen of the second addition polymerizable aromatic monomer is selected from the group consisting of chlorine, bromine, iodine and mixtures thereof.

7. The polymer polyol of claim 5 where the second addition copolymerizable aromatic monomer is selected from the group of aromatic monomers consisting of:

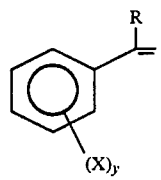

wherein R is an alkyl, aryl, alkylaryl group or hydrogen; X is a halogen atom selected from the group consisting of Cl, Br and I, and y averages from greater than 1 to 5.

8. The polymer polyol of claim 5 where the first addition copolymerizable monomer is acrylonitrile.

9. The polymer polyol of claim 5 where the first addition copolymerizable monomer is styrene and where acrylonitrile is additionally present as a third addition copolymerizable monomer.

10. The polymer polyol of claim 5 where the second addition polymerizable aromatic monomer component is tribromostyrene.

11. A fire retardant polyurethane foam made by reacting a polyisocyanate with a polymer polyol in the presence of a polyurethane catalyst, where the polymer polyol is produced by a process comprising polymerizing, via a free-radical reaction, an addition polymerizable aromatic monomer component with ethylenic unsaturation having at least one aromatic halogen, in the presence of a polyol.

12. The fire retardant polyurethane foam of claim 11 where the halogen is selected from the group consisting of chlorine, bromine, iodine and mixtures thereof.

13. The fire retardant polyurethane foam of claim 11 where the aromatic monomer component is selected from the group of aromatic monomers consisting of:

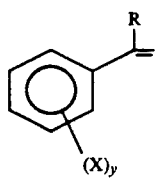

where R is an alkyl, aryl, alkylaryl group or hydrogen; X is a halogen atom selected from the group consisting of Cl, Br and I, and y averages from greater than 1 to 5.

14. The fire retardant polyurethane foam of claim 11 where the aromatic monomer component is tribromostyrene.

15. A fire retardant polyurethane foam made by reacting a polyisocyanate with a polymer polyol in the presence of a polyurethane catalyst, where the polymer polyol is produced by a process comprising polymerizing, via a free-radical reaction, a first addition polymerizable monomer component with ethylenic unsaturation, with a second addition polymerizable aromatic monomer component with ethylenic unsaturation which contains more than one aromatic halogen, in the presence of a polyol.

16. The fire retardant polyurethane foam of claim 15 where the halogen of the second addition polymerizable aromatic monomer is selected from the group consisting of chlorine, bromine, iodine and mixtures thereof.

17. The fire retardant polyurethane foam of claim 15 where the second addition copolymerizable aromatic monomer is selected from the group of aromatic monomers consisting of:

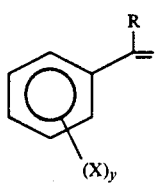

where R is an alkyl, aryl, alkylaryl group or hydrogen; X is a halogen atom selected from the group consisting of Cl, Br and I, and y averages from greater than 1 to 5.

18. The fire retardant polyurethane foam of claim 15 where the first addition copolymerizable monomer is acrylonitrile.

19. The fire retardant polyurethane foam of claim 15 where the second addition copolymerizable aromatic monomer is tribromostyrene.

20. A fire retardant polyurethane foam made by reacting a polyisocyanate with a polymer polyol in the presence of a polyurethane catalyst, where the polymer polyol is produced by a process comprising polymerizing, via a free-radical reaction, a first addition polymerizable monomer component with ethylenic unsaturation, with tribromostyrene, in the presence of a base polyol;

where only one additional flame retardant additive is present in the fire retardant polyurethane foam, where the additional additive is selected from the group consisting of phosphorous compounds, halogenated compounds, aluminum trihydrate, exfoliated graphite, urea, melamine and melamine derivatives; and where the fire retardant polyurethane foam passes the British Standard 5852, Part 2, Ignition Source 5 Combustion Test.

21. A fire retardant polyurethane foam made by reacting a polyisocyanate with a polymer polyol in the presence of a polyurethane catalyst, where the polymer polyol is produced by a process comprising polymerizing, via a free-radical reaction, a first addition polymerizable monomer component with ethylenic unsaturation, with tribromostyrene, in the presence of a base polyol;

where at least one additional flame retardant additive is present in the fire retardant polyurethane foam, where the additional additive is selected from the group consisting of phosphorous compounds, halogenated compounds, aluminum trihydrate, exfoliated graphite, urea, melamine, melamine derivatives, and mixtures thereof; and where the fire retardant polyurethane foam passes the British Standard 5852, Part 2, Ignition Source 5 Combustion Test.

22. A fire retardant polyurethane foam made by reacting a polyisocyanate with a polymer polyol in the presence of a polyurethane catalyst, where the polymer polyol is produced by a process comprising polymerizing, via a free-radical reaction, an addition polymerizable monomer component with ethylenic unsaturation having at least one aromatic halogen, in the presence of a polyol;

where only one additional flame retardant additive is present in the fire retardant polyurethane foam, where the additional additive is selected from the group consisting of phosphorous compounds, halogenated compounds, aluminum trihydrate, exfoliated graphite, urea, melamine and melamine derivatives; and where the proportion of the one additional flame retardant additive is less than that proportion required to pass the British Standard 5852, Part 2, Ignition Source 5 Combustion Test in the absence of the monomer having at least one aromatic halogen.

23. A fire retardant polyurethane foam made by reacting a polyisocyanate with a polymer polyol in the presence of a polyurethane catalyst, where the polymer polyol is produced by a process comprising polymerizing, via a free-radical reaction, an addition polymerizable monomer component with ethylenic unsaturation having at least one aromatic halogen, in the presence of a polyol;

where at least one additional flame retardant additive is present in the fire retardant polyurethane foam, where the additional additive is selected from the group consisting of phosphorous compounds, halogenated compounds, aluminum trihydrate, exfoliated graphite, urea, melamine, melamine derivatives and mixtures thereof; and where the proportion of each additional flame retardant additive is less than that proportion required to pass the British Standard 5852, Part 2, Ignition Source 5 Combustion Test in the absence of the monomer having at least one aromatic halogen.

24. The polymer polyol of claim 1 where the aromatic monomer component has an average number of halogen atoms greater than 1 and up to 5.

25. The polymer polyol of claim 5 where the aromatic monomer component has an average number of halogen atoms greater than 1 and up to 5.

26. The fire retardant polyurethane foam of claim 11 where in the polymer polyol the aromatic monomer component has an average number of a halogen atoms greater than 1 and up to 5.

27. The fire retardant polyurethane foam of claim 15 where in the polymer polyol the aromatic monomer component has an average number of halogen atoms greater than 1 and up to 5.

28. The fire retardant polyurethane foam of claim 22 where in the polymer polyol the aromatic monomer component has an average number of halogen atoms greater than 1 and up to 5.

29. The fire retardant polyurethane foam of claim 23 where in the polymer polyol the aromatic monomer component has an average number of halogen atoms greater than 1 and up to 5.

30. The polymer polyol of claim 1 where the aromatic monomer component is dibromostyrene.

31. The polymer polyol of claim 5 where the second addition polymerizable aromatic monomer component is dibromostyrene.

32. The polyurethane foam of claim 11 where the aromatic monomer component is dibromostyrene.

33. The polyurethane foam of claim 15 where the second addition polymerizable aromatic monomer component is dibromostyrene.

34. The polyurethane foam of claim 22 where the aromatic monomer component is dibromostyrene.

35. The polyurethane foam of claim 23 where the aromatic monomer component is dibromostyrene.

36. The polymer polyol of claim 1 produced by homopolymerizing dibromostyrene.

37. The polymer polyol of claim 1 produced by copolymerizing dibromostyrene and acrylonitrile.

38. The polymer polyol of claim 1 produced by copolymerizing dibromostyrene, acrylonitrile and styrene.

39. The polymer polyol of claim 1 produced by homopolymerizing tribromostyrene.

40. The polymer polyol of claim 1 produced by copolymerizing tribromostyrene and acrylonitrile.

41. The polymer polyol of claim 1 produced by copolymerizing tribromostyrene, acrylonitrile and styrene.

42. The polymer polyol of claim 5 where
the first addition polymerizable monomer component is selected from the group consisting of styrene, acrylonitrile and mixtures thereof, and
the second addition polymerizable aromatic monomer component is selected form the group consisting of dibromostyrene, tribromostyrene and mixtures thereof.

43. The polyurethane foam of claim 11 where the polymer polyol is produced by homopolymerizing dibromostyrene.

44. The polyurethane foam of claim 11 where the polymer polyol is produced by copolymerizing dibromostyrene and acrylonitrile.

45. The polyurethane foam of claim 11 where the polymer polyol is produced by copolymerizing dibromostyrene, acrylonitrile and styrene.

46. The polyurethane foam of claim 11 where the polymer polyol is produced by homopolymerizing tribromostyrene.

47. The polyurethane foam of claim 11 where the polymer polyol is produced by copolymerizing tribromostyrene and acrylonitrile.

48. The polyurethane foam of claim 11 where the polymer polyol is produced by copolymerizing styrene, tribromostyrene and acrylonitrile.

49. The polyurethane foam of claim 15 where in the production of the polymer polyol
the first addition polymerizable monomer component is selected from the group consisting of styrene, acrylonitrile and mixtures thereof, and
the second addition polymerizable aromatic monomer component is selected from the group consisting of dibromostyrene, tribromostyrene and mixtures thereof.

50. The polyurethane foam of claim 11 where the polymer polyol is produced in the presence of a blend of polyols.

51. The polyurethane foam of claim 11 further comprising at least one additional polyol selected from the group consisting of polyols and polymer polyols.

52. The polyurethane foam of claim 15 where the polymer polyol is produced in the presence of a blend of polyols.

53. The polyurethane foam of claim 15 further comprising at least one additional polyol selected from the group consisting of polyols and polymer polyols.

54. The polymer polyol of claim 1 produced in the presence of an organic solvent.

55. The polymer polyol of claim 1 produced in the presence of a dispersant.

56. The polymer polyol of claim 5 produced in the presence of an organic solvent.

57. The polymer polyol of claim 5 produced in the presence of a dispersant.

58. The polyurethane foam of claim 11 where the polymer polyol is produced in the presence of an organic solvent.

59. The polyurethane foam of claim 11 where the polymer polyol is produced in the presence of a dispersant.

60. The polyurethane foam of claim 15 produced in the presence of a dispersant.

61. The polyurethane foam of claim 15 where the polymer polyol is produced in the presence of an organic solvent.

* * * * *